(12) United States Patent
Cicalini et al.

(10) Patent No.: US 9,132,962 B2
(45) Date of Patent: Sep. 15, 2015

(54) ACCUMULATOR FOR PAPER ROLLS OR OTHER ELONGATED PRODUCTS AND RELATED METHOD

(75) Inventors: Giancarlo Cicalini, Castelvecchio di Compito (IT); Romano Maddaleni, Bientina (IT)

(73) Assignee: Fabio Perini S.p.A., Lucca (IT)

( * ) Notice: Subject to any disclaimer, the term of this patent is extended or adjusted under 35 U.S.C. 154(b) by 129 days.

(21) Appl. No.: 13/983,471

(22) PCT Filed: Jan. 26, 2012

(86) PCT No.: PCT/IT2012/000023
§ 371 (c)(1),
(2), (4) Date: Aug. 30, 2013

(87) PCT Pub. No.: WO2012/104881
PCT Pub. Date: Aug. 9, 2012

(65) Prior Publication Data
US 2014/0151192 A1 Jun. 5, 2014

(30) Foreign Application Priority Data
Feb. 3, 2011 (IT) .............................. FI2011A00203

(51) Int. Cl.
*B65G 17/12* (2006.01)
*B65G 17/42* (2006.01)
(Continued)

(52) U.S. Cl.
CPC .............. *B65G 17/126* (2013.10); *B65G 17/42* (2013.01); *B65G 47/5122* (2013.01); *B65H 19/30* (2013.01); *B65H 2301/41447* (2013.01); *B65H 2301/41726* (2013.01); *B65H 2701/1924* (2013.01)

(58) Field of Classification Search
CPC ........... B65G 47/5122; B65G 47/5118; B65G 17/126; B65G 17/42; B65H 19/30
USPC ............. 198/347.1, 435, 465.1, 465.3, 465.4, 198/712, 797, 867.01, 867.11, 867.15, 198/803.2
See application file for complete search history.

(56) References Cited

U.S. PATENT DOCUMENTS 4,089,408 A * 5/1978 Vanderhoof ................ 198/890.1
4,142,626 A * 3/1979 Bradley .................... 198/797
(Continued)

FOREIGN PATENT DOCUMENTS

DE  8303544 U1  7/1983
DE  4025706 A1  2/1992
(Continued)

OTHER PUBLICATIONS

Ciro Guarini (Futura Spa); Accumulatore per rotoli di materiale cartaceo o logs (Accumulator for Rolls of Paper or Logs); Italian Patent Application No. IT2008F100109 Filed Nov. 28, 2009.

*Primary Examiner* — Leslie A Nicholson, III
*Assistant Examiner* — Keith R Campbell
(74) *Attorney, Agent, or Firm* — Breiner & Breiner, L.L.C.

(57) ABSTRACT

The accumulator includes at least one pair of chains substantially parallel to each other to which cradles are connected for receiving products to be stored, the cradles being mutually spaced along the pair of chains. Each cradle is connected to the pair of chains through constraining members. On each chain at least one intermediate constraining member is arranged between two adjacent cradles connected to the chains.

21 Claims, 11 Drawing Sheets

(51) Int. Cl.
*B65G 47/51* (2006.01)
*B65H 19/30* (2006.01)

(56) References Cited

U.S. PATENT DOCUMENTS 4,168,776 A * 9/1979 Hoeboer ................ 198/797
5,636,722 A    6/1997 Koop
6,053,304 A * 4/2000 Biagiotti ............... 198/794
6,279,721 B1 * 8/2001 Lyngso et al. ........... 198/369.2
2006/0201785 A1 9/2006 Moeller
2007/0125625 A1 * 6/2007 Ackley ................. 198/867.11

FOREIGN PATENT DOCUMENTS

GB    2078691      *  1/1982
GB    2078691 A       1/1982
JP    52140395 U     10/1977

* cited by examiner

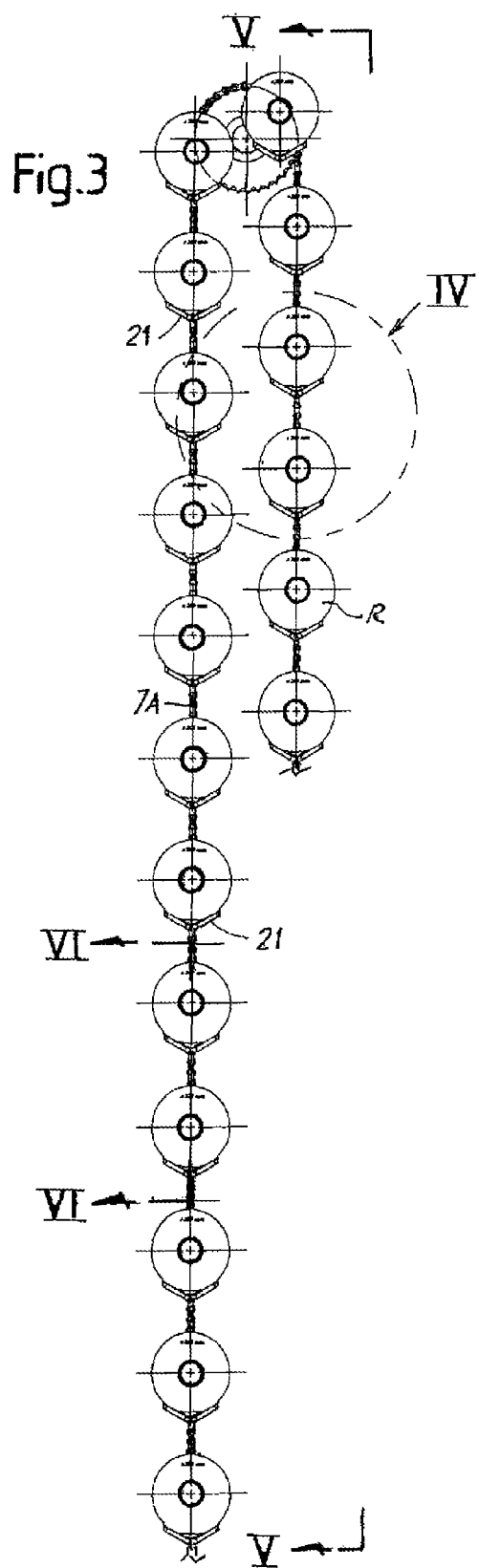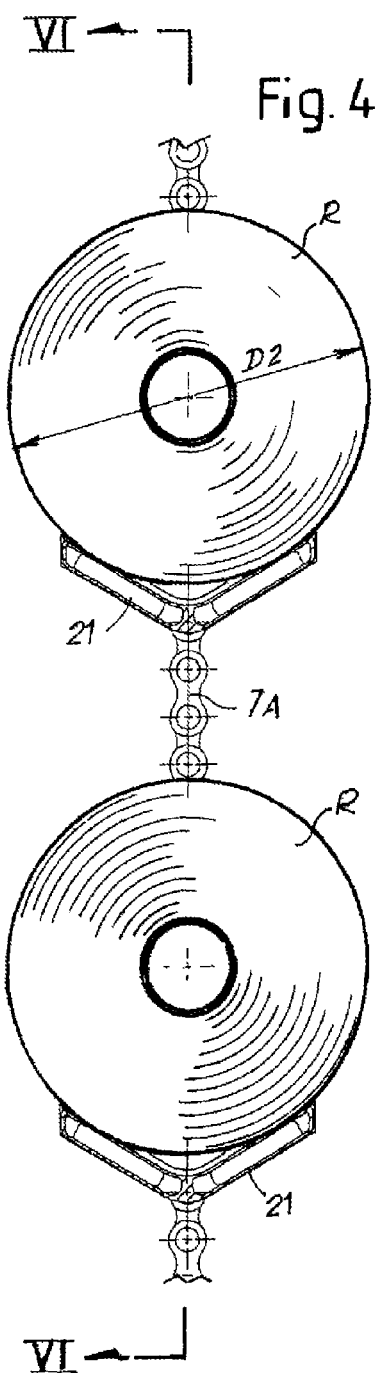

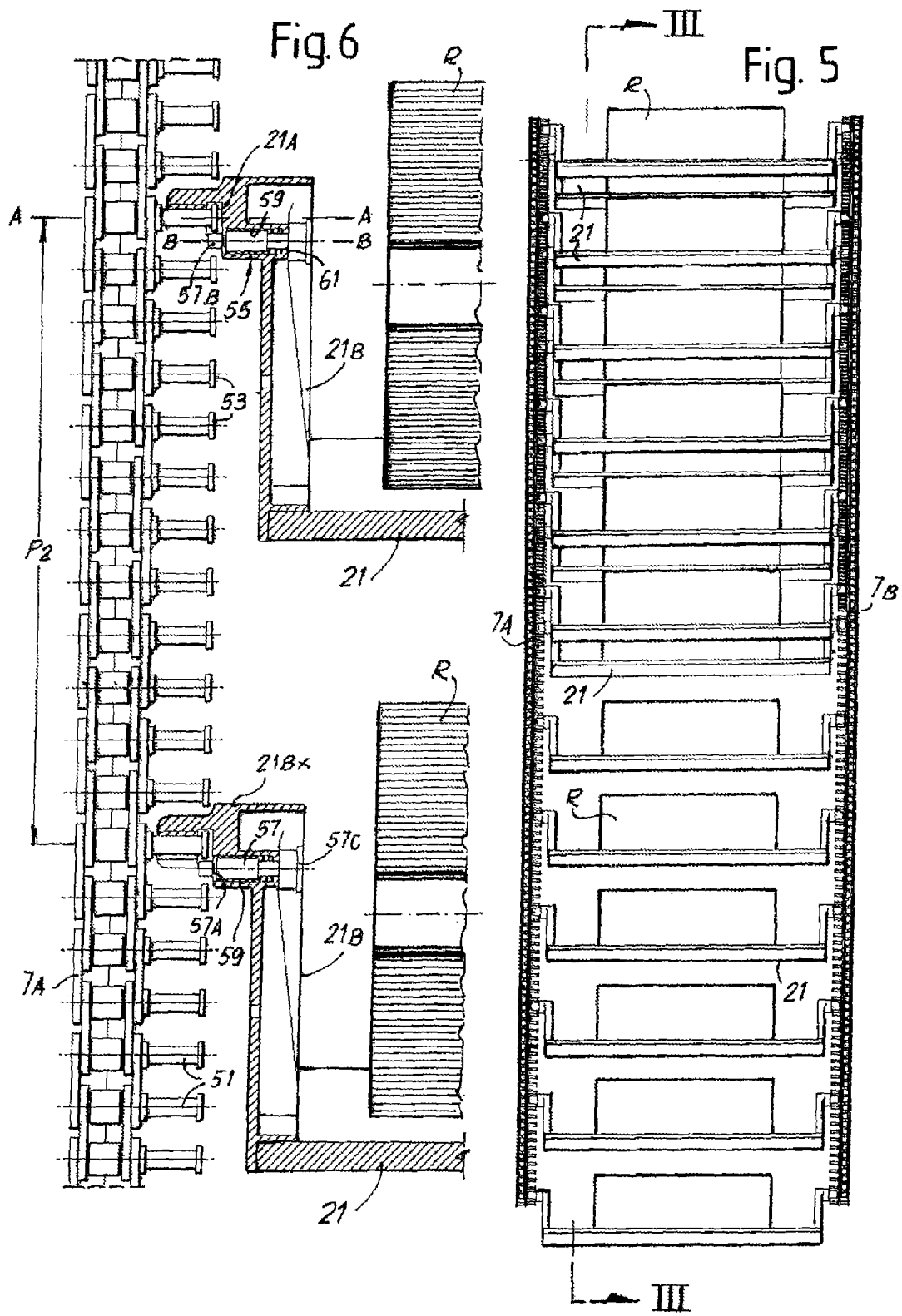

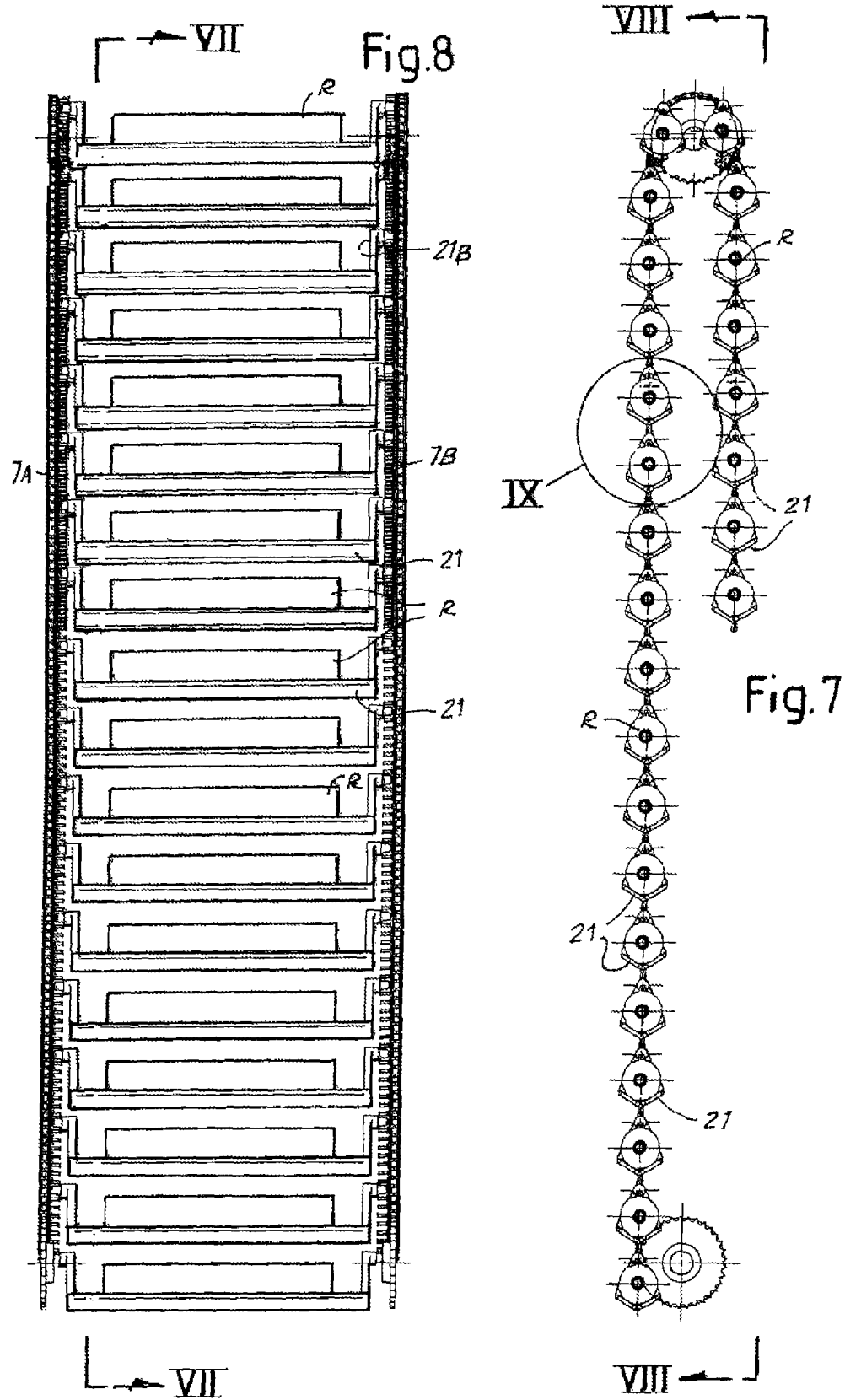

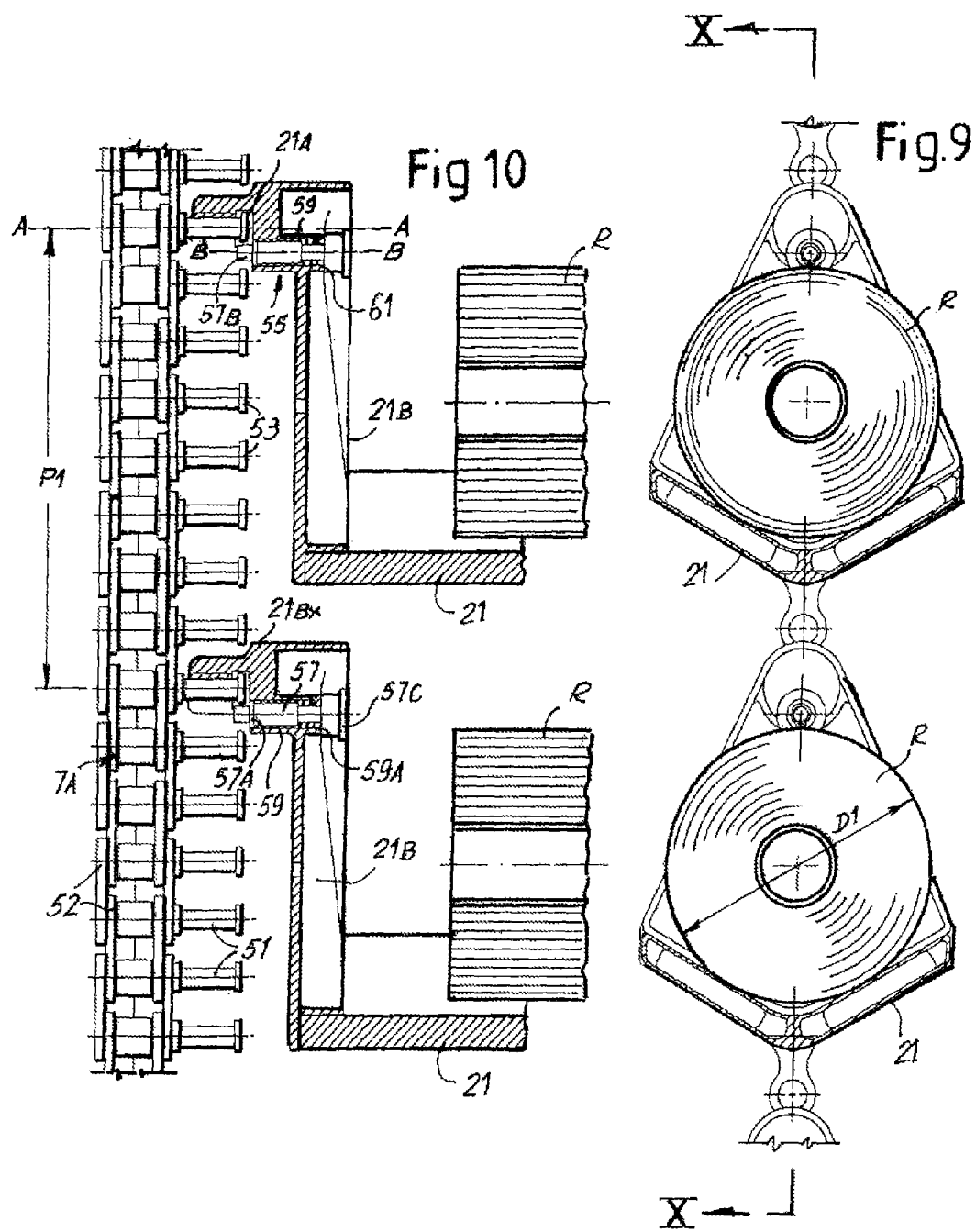

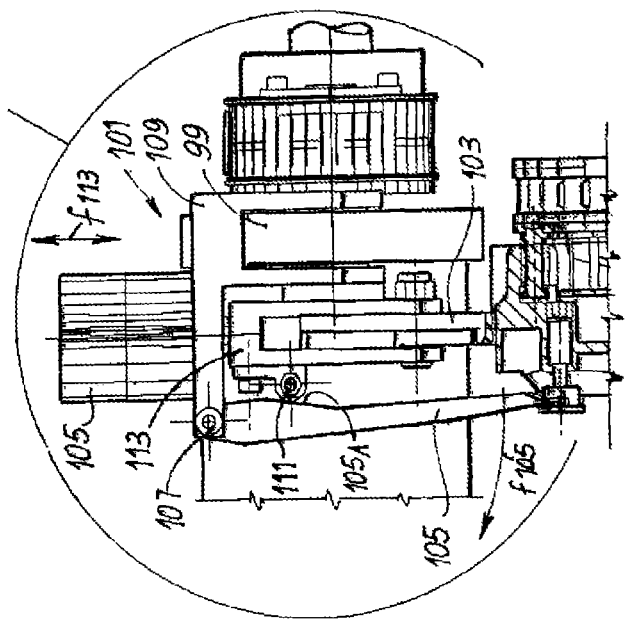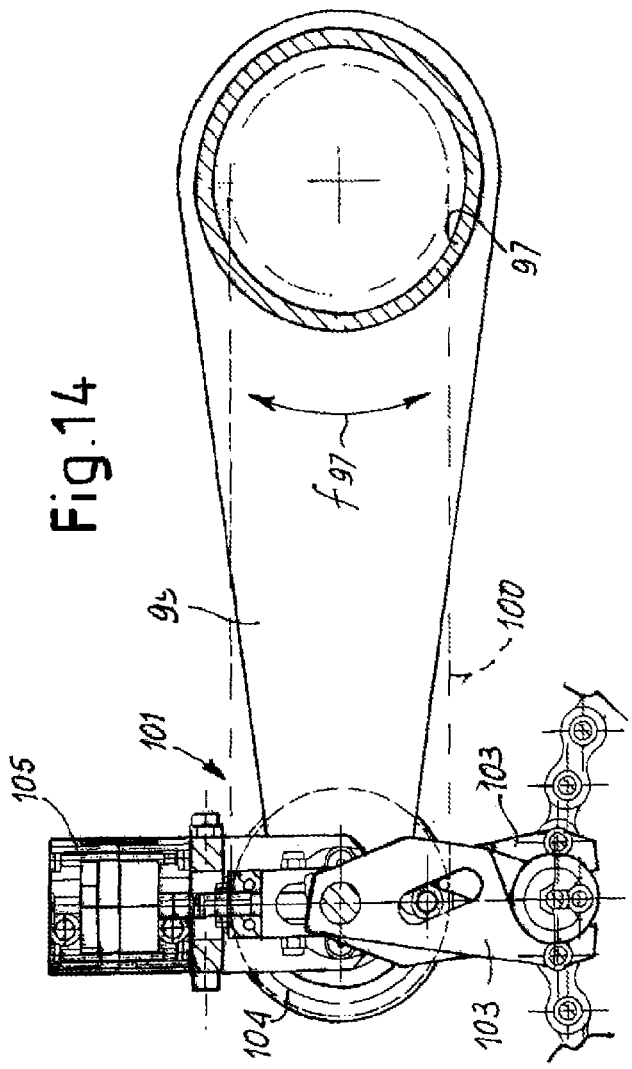

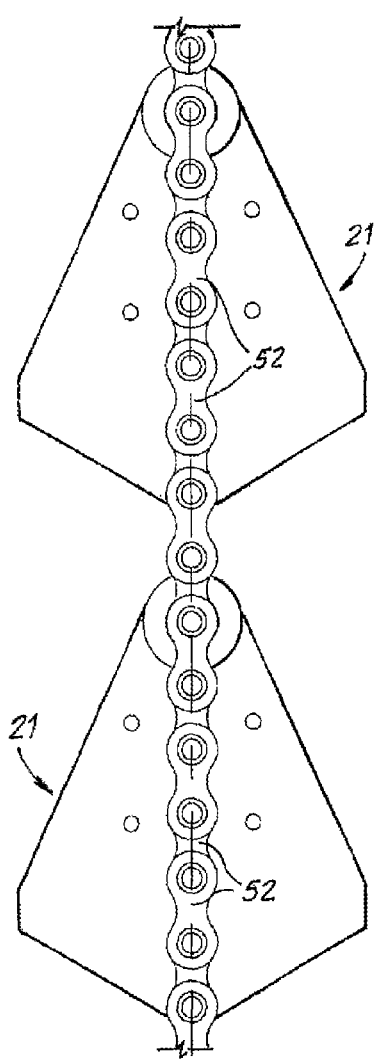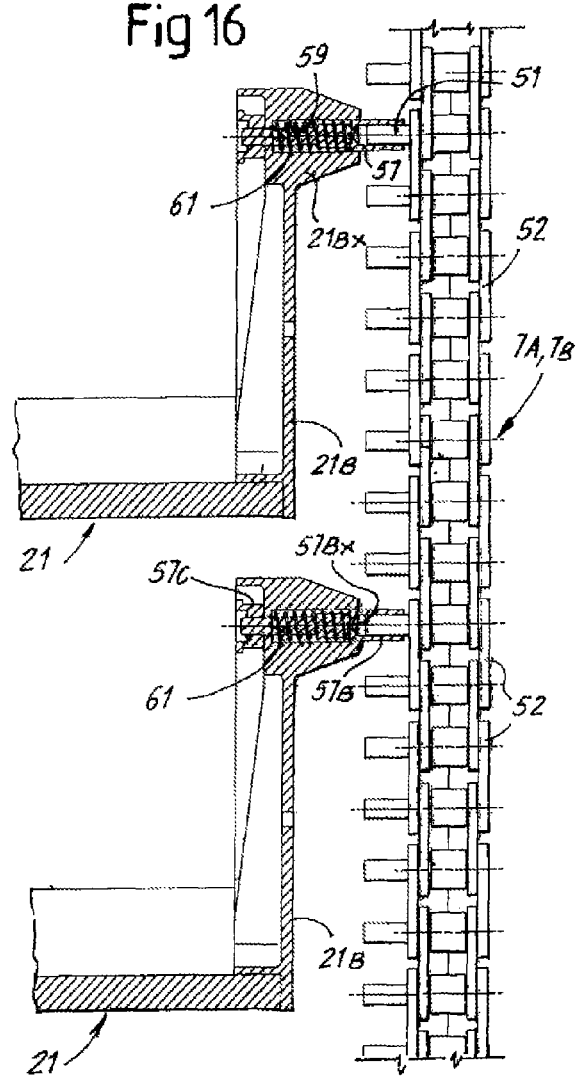

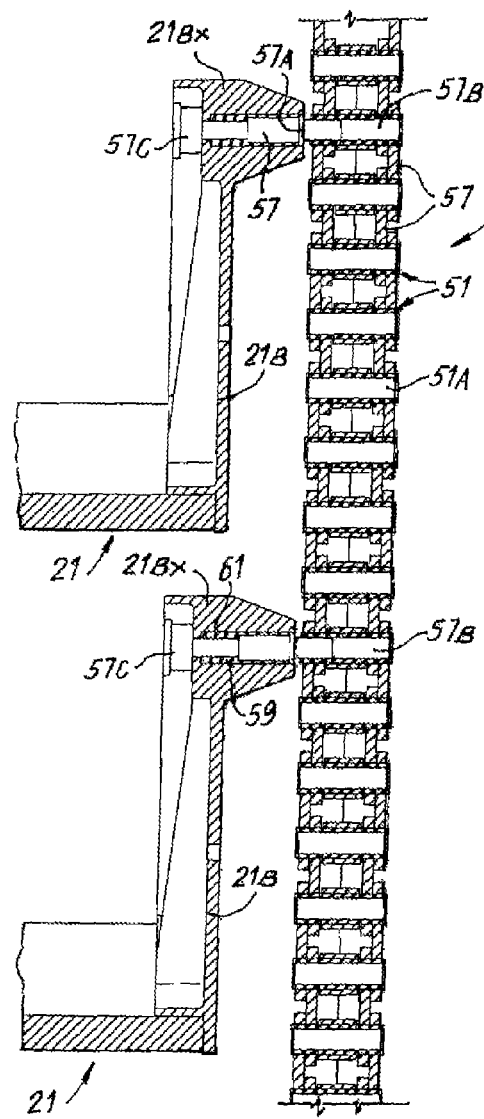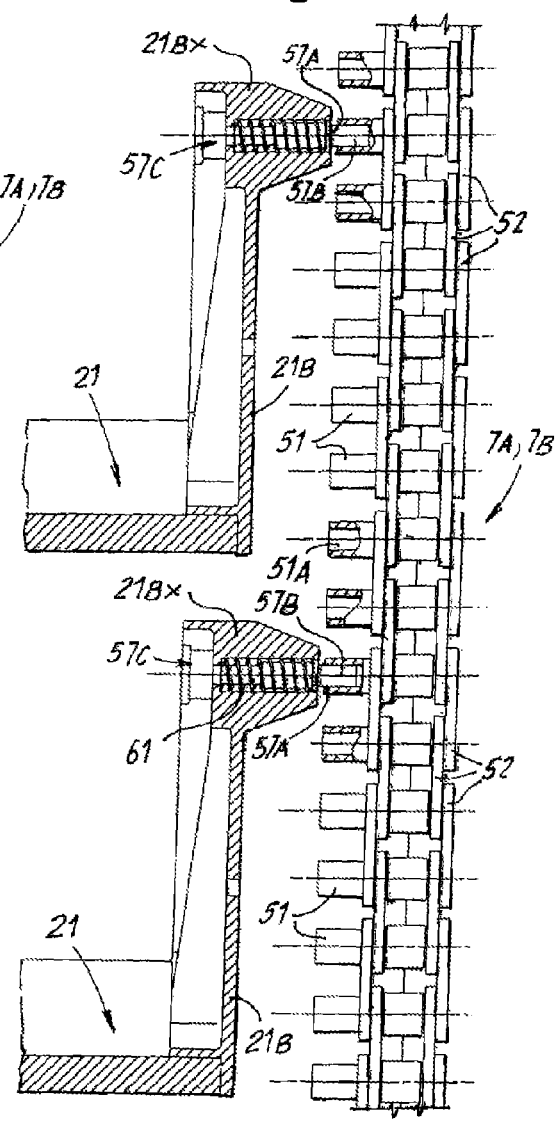

ACCUMULATOR FOR PAPER ROLLS OR OTHER ELONGATED PRODUCTS AND RELATED METHOD

TECHNICAL FIELD

The present invention relates to accumulators for elongated products, in particular, although not exclusively, for accumulating paper rolls, such as tissue paper or the like, coming for instance from a rewinding machine.

STATE OF THE ART

In many production lines, wherein a plurality of stations or process machines, arranged in line, perform subsequent steps to transform a product, starting from a semi-finished to a finished product, an accumulator must be interposed between two subsequent stations or machines, to separate the production rate of a station or machine from that of the other station or machine.

This is for instance required also in paper converting lines, in particular in tissue paper converting lines to produce rolls or logs that are subsequent cut to form small rolls that, once adequately packaged, are destined for distribution and consumption.

In the tissue paper converting lines rewinding machines are typically used, that produce logs or rolls of paper wound in length equal to the length of the paper present in the small rolls destined for consumption. The rolls or logs produced by the rewinding machines however have an axial length equal to a multiple of the axial length of the small rolls. Therefore, the rolls or logs shall be furthermore processed both to glue the free end of the wound paper and to subdivide each log or roll into a plurality of small rolls, after having eliminated the head and tail trimmings of each rolls.

To this end, gluing machines and severing machines are arranged downstream from the rewinders, and downstream of them trimming and packaging machines are arranged. Accumulators are arranged between the rewinding machine and the downstream machines, typically between the gluer located directly downstream from the rewinding machine and the severing machine downstream of the gluer. The rolls or logs produced by the rewinders and, as the case may be, closed by gluing the end free edge, are collected in these accumulators. These accumulators allow to separate the production rate of the rewinding machines from the production rate of the severing machines.

U.S. Pat. No. 6,053,304 discloses an example of an accumulator for rolls or logs of wound web material.

An accumulator specific to temporary storage of wound web material logs has at least a pair of substantially parallel chains, arranged according to two substantially equal closed paths. Cradles for receiving the products to be stored are connected to the chains. Usually, each of these cradles is hinged, at the ends thereof, around substantially horizontal coinciding pivoting axes. The chains are driven in a known manner around idler wheels with fixed and movable axes, subdividing the two chains into storing branches for the logs and empty branches, i.e. where the cradles are devoid of web material logs or rolls. By varying the length of the full branches and of the empty branches it is possible to store variable quantities of rolls in the accumulator, so as to collect the supernumerary rolls introduced by the rewinder in case of stop or slowdown of the downstream severing machine. Vice versa, it is also possible to feed the downstream severing machine even if the rewinder slows the production or stops temporarily.

One or two motorizations are usually provided in the known accumulators to move the pair of chains, preferably with a continuous movement at variable speed instead of an intermittent one, so as to avoid vibrations and dynamic stresses on the accumulator.

The same production line can be adjusted so as to produce rolls with greater or lower diameter dimensions according to the various production requirements. The same production line can produce for instance rolls of toilet paper, or rolls of kitchen towels, for domestic or professional or industrial use. It is possible to adapt the various machines of the converting line for producing rolls even of highly variable diameter, typically between 100-120 mm and 180-220 mm, more often between around 120 and around 200 mm.

The distance between the cradles for receiving the rolls in the accumulator must be compatible with the roll diameter. In the known accumulators the cradles are usually arranged at a constant reciprocal distance, i.e. a distance equal for all the pairs of consecutive cradles. This distance or pitch, at which the cradles are arranged, is equal to the maximum diameter of the rolls that can be stored in the accumulator. Rolls of greater diameter cannot be collected in the accumulator, as there is not sufficient space between one cradle and the subsequent cradle. An accumulator designed for a given maximum diameter can also receive rolls of lower diameter, but in this case the use of the space will not be optimum, as the distance between a cradle and the subsequent cradle is greater than the minimum distance compatible with the roll diameter.

The Italian patent application FI2008A000109 discloses an accumulator for paper rolls, wherein the cradles are arranged at different distances from one another, so that in the same accumulator there are pairs of cradles arranged according to a first pitch, i.e. a first reciprocal distance, lower than other cradle pairs arranged at a greater pitch, i.e. at a greater reciprocal distance. Thanks to the fact that the cradles are arranged spaced from each other according to at least two different pitches, it is possible to use the cradles spaced by a greater pitch for storing rolls of greater diameter, without using the cradles arranged at a smaller reciprocal distance. Vice versa, when rolls of smaller diameter dimension are processed, all the cradles can be used, thanks to the fact that the rolls, of smaller diameter dimensions, can be received also in the cradles arranged at a nearer pitch.

The aim of this known accumulator is to avoid providing, in the same roll production line, two distinct accumulators and one deviator. It has the great disadvantage that in all cases, independently of the roll diameter, the accumulator capacity is only partially exploited. In fact, when the rolls have a greater diameter, the cradles arranged at a smaller distance from each other remain empty. When the rolls have a smaller diameter, the space between the cradles at a greater pitch is oversized with respect to the actually necessary space. In any case there is therefore an inefficient exploitation of the space along the production line.

In addition to this, the rolls are arranged along the chains at a non-constant pitch. Managing the accumulator is therefore more difficult, as it is necessary to control the forward chain movement by means of a complex management system in order to take into account the non-uniform distribution of the rolls along the longitudinal extension of the chains carrying the cradles. Dynamic stresses can also occur, due to the non-uniformity in the load distribution along the extension of the chains carrying the cradles.

SUMMARY OF THE INVENTION

The object of the present invention is to provide an accumulator for elongated products, in particular and preferably, although not exclusively, logs or rolls of wound web material, for instance paper material, such as tissue paper and the like, that fully or partially overcomes the disadvantages of the known accumulators.

According to one aspect, the invention substantially provides for an accumulator for elongated products, comprising at least one pair of chains substantially parallel to each other, to which cradles are connected for receiving the products to be stored, the cradles being mutually spaced along said pair of chains, wherein each cradle is connected, for instance suspended as a pendulum, to said pair of chains through constraining members, the constraining members defining an oscillation axis of the cradle with respect to the pair of chains. On each chain at least one intermediate constraining member is arranged between two adjacent cradles connected to said chains.

With such an arrangement it is possible to connect the cradles according to variable pitches or reciprocal distances, thus optimizing the reciprocal distance according to the transverse dimension of the elongated products to be stored. If the products are rolls, the transverse dimension is typically the roll outer diameter. According to one embodiment, an accumulator for elongated products is provided, comprising: at least one pair of chains substantially parallel to each other, to which cradles are pivotally connected for receiving the products to be stored, the cradles being mutually spaced along said pair of chains, wherein each cradle is connected to said pair of chains by means of constraining members; a product inlet; and a product outlet; wherein said chains are driven around wheels with movable axes supported by a movable support an wheels with fixed axes, said wheels subdividing the two chains into storing branches in which products are stored and empty branches, a lifting and lowering movement of said movable support modifying the length of the storing branches and the empty branches to modify the quantity of products stored in the accumulator; and further comprising an characterized in that on each chain is arranged at least one constraining member intermediate between two consecutive cradles connected to said chains.

In advantageous embodiments the chains are arranged according to a double-festoon arrangement. The chains are for example entrained around upper wheels and lower wheels having respective fixed axes, i.e. axes fixed with respect to a supporting structure of the accumulator. Between the upper and lower fixed wheels a movable support is provided, on which a first set of upper movable wheels and a second set of lower movable wheels are supported. The wheels on the movable support have movable axes, i.e. axes which are movable with respect to the structure of the accumulator, as the wheels move along with the support on which they are mounted. A first festoon is formed by upper chain branches extending between the upper fixed wheels and the upper movable wheels on the support. A second festoon is formed by lower chain branches extending between the lower movable wheels on the support and the lower fixed wheels. A double festoon is thus formed. The support moves up and down to modify the length of the branches of the two festoons to accommodate a variable number of products. One of the two festoons contains full cradles and the other contains empty cradles.

Advantageously, products are loaded along an inlet, or loading branch extending between a pair of upper fixed wheels and a pair of lower fixed wheels on an inlet side of the accumulator. Products are unloaded along an outlet, or unloading branch extending between a pair of upper fixed wheel and a pair of lower fixed wheels.

Each product is loaded in a respective cradle along said loading or inlet branch and is unloaded along said unloading or outlet branch.

The arrangement is such that full cradles, i.e. cradles on which products are loaded, move along the path defined by one of the two festoons and around the respective wheels around which the chains forming the festoon are entrained.

In some embodiments the pitch at which the cradles are arranged is preferably constant and adjustable. In some configuration it can be necessary to provide for a constant pitch between all the adjacent cradles except than a pair of cradles, between which an anomalous pitch is provided, different than the pitch at which the other accumulator cradles are arranged.

The optimum reciprocal distance between adjacent cradles is the distance, preferably equal for each pair of adjacent cradles along the chains, that allows the minimum necessary space for loading and unloading the rolls from and onto the cradles, maximizing at the same time the number of cradles connected to the chain.

In some embodiments each chain comprises a plurality of groups of chain links; each group of chain links comprises at least one constraining member for the cradles. For instance, and preferably, a group of chain links comprises a single link, i.e. the chains have a constraining member for each link. Advantageously, the constraining member is located at an articulation between adjacent links. In the preferred configuration the chains have therefore a constraining member in correspondence of each articulation between adjacent links. In less advantageous embodiments a lower number of constraining members can be provided, for instance one member for each two reciprocal articulations between adjacent links. Providing a constraining member for each articulation of two adjacent chain links allows obtaining maximum operational flexibility.

In general, even if there are less constraining members than links, the reciprocal distance between the constraining members is preferably constant, for instance the distance between two adjacent constraining members can be always of two links along all the chain extension. This substantially simplifies the accumulator management.

In some embodiments, each chain is subdivided into chain modules, each of which comprises a number of chain links corresponding to the lowest common multiple of a plurality of pitches at which the cradles can be arranged along said chains, each pitch being measured as chain links interposed between a cradle and the subsequent cradle.

In some embodiments, each cradle is provided with devices for fast coupling to the chains to simplify the coupling and releasing operations and therefore the accumulator configuration according to the transverse dimension of the products to be stored. The fast coupling devices can comprise for instance resilient fastening elements for fastening to pins fixed to the chains.

For a more practical and simpler management of the cradles, in some embodiments the accumulator can comprise a storing device for storing the cradles exceeding the cradles that must be connected to the chains.

The cradles can be arranged and connected to the chains manually In improved embodiments of the invention the accumulator can however comprise or be associated with a system for positioning, coupling and releasing the cradles along said chains. The positioning system can be operated manually, i.e. it can be controlled by an operator. Through a pushbutton station or any other user interface, the operator can for instance move the chains forwards, couple or release the cradles, transfer the cradles to a storing device, take the cradles from the storing device, move the cradles along the chain extension, etc.

In improved embodiments of the invention it is also possible to provide that the positioning system is controlled automatically by an electronic control unit. In this case, advantageously the operator shall only set the necessary and sufficient data to indicate to the control unit the pitch at which the cradles must be connected to the chains. This can be made by inserting the number of chain links, or the pitch or reciprocal distance between adjacent cradles. In other embodiments the operator can insert directly information related to a transverse dimension (for instance the diameter) of the product to be stored. The control unit will automatically calculate the pitch that must be used between adjacent cradles.

In further embodiments the control unit is associated with a memory containing data related to various types or dimensions of products, and the operator must only insert an identification code for the product type.

The control unit can be the same control unit of another machine, station or unit in the line in which the accumulator is contained. The control unit managing the accumulator can be for instance directly the same control unit of the upstream rewinding machine. In this case, simply by selecting the product type to be wound, the pitch, i.e. the reciprocal distance between adjacent cradles on the chains, is selected It should be understood that in general the pitch between adjacent cradles depends upon a transverse dimension of the elongated products to be stored, for instance, as mentioned, the diameter in the case of rolls. Particular situations can however occur, wherein in addition to the dimension other factors can affect or modify the pitch at which the cradles must be positioned. It could be for instance necessary to provide more space between the cradles when the products to be stored are particularly heavy and it is therefore necessary to reduce the overall number of products accumulated on the accumulator. To do this, some cradles can be left empty for instance, or it is possible to arrange the cradles at a greater pitch, i.e. at a greater reciprocal distance. For instance, if a given pitch, or reciprocal distance, is suitable to process paper rolls of a given diameter, wound at low density and therefore with a low specific weight, the same quantity of rolls of the same diameter, but wound in a more compact manner, could be too heavy. In this case, to avoid an overload of the accumulator it is possible to modify the arrangement of the accumulator using a lower number of cradles, arranged at a reciprocal distance greater than the distance in the previous case even if the roll diameter is the same. In this way there is no risk of overloading the accumulator.

If the accumulator is associated with a positioning system and a storing device, the positioning system can also comprise transferring members for transferring the cradles from the storing device and vice versa. In some embodiments the positioning system can comprise actuators for releasing and coupling the cradles.

In some embodiments the accumulator comprises at least one motorization, for instance an electric motor, to move the chains forward, and a control unit for controlling the motorization, that can be programmed so as to move the chains forwards in a stepped manner, the forward step being selectable by a user among at least two different forward steps. This forward step corresponds to the pitch or reciprocal distance between two adjacent cradles. This allows the operator to set in a simpler manner the accumulator when the reciprocal distance, i.e. the pitch between cradles, must be modified. In fact, it is sufficient to position a start cradle, that can be for instance identified through a particular color, different than the others, in a precise point of the chain path. The position can be identified through a reference in the bearing structure of the accumulator. Once this has been made, it is possible to move forward the chains in a stepped manner, and they will position at each step with a constraining member in correspondence of the aforesaid reference. The operator must only attach the cradle in correspondence of each constraining member that, at each step, is in correspondence of the aforesaid reference. If during this operation a cradle is between the reference and the cradle previously coupled in the correct position, the operator will remove it and position it correctly. The entire accumulator will completely configured when the first cradle passes again the in the position where there is the aforesaid reference.

A similar process, more expensive due to a lower automation degree but possible with a simpler accumulator, provides for the use of two references at an adjustable reciprocal distance. The reciprocal distance corresponds to the pitch, i.e. to the reciprocal distance at which the cradles must be fixed to the chains.

According to another aspect, the invention provides for an accumulator for elongated products comprising a pair of chains substantially parallel to each other, provided with a plurality of constraining members distributed along said chains, spaced from each other according to a reciprocal pitch. The accumulator furthermore comprises a plurality of cradles for receiving the products to be stored, connected in a reversible manner to said chains through said constraining members. The cradles are spaced from each other along said pair of chains according to a reciprocal pitch greater than the pitch between the constraining members on said chains. In this way it is possible to modify the accumulator configuration by varying the pitch between subsequent cradles according to the transverse dimension if the products to be stored, for instance according to the diameter in the case of rolls. In some embodiments the pitch between cradles is substantially equal to a multiple of the pitch between the constraining members, so that the cradles can be spaced according to one or the other of two or more different pitches, each defined by a different number of pitches between constraining members for constraining the cradles to the chains.

The pitch or reciprocal distance between cradles is preferably equal, i.e. constant for all the pairs of reciprocal cradles, with the exclusion, if necessary, of a single pair of cradles presenting a reciprocal distance lower than the other pairs. Preferably, the reciprocal distance between consecutive constraining members, i.e. the pitch according to which these constraining members are arranged along the respective chain, is constant for all the constraining members of a chain.

The invention also relates to a method for configuring an accumulator of the type defined above comprising the steps of:
  determining the reciprocal distance at which consecutive cradles must be arranged according to the dimension of said elongated products;
  connecting said cradles to said chains at said reciprocal distance.

Practically, according to one embodiment the invention provides for a method for configuring an accumulator comprising chains and cradles connected with (for instance articulated to) said chains, comprising the steps of:
  determining the reciprocal distance at which consecutive cradles connected to said chains must be arranged according to the dimension of said elongated products;
  connecting sequentially said cradles to said chains according to a pitch corresponding to the determined reciprocal distance until to occupy the extension of the chains.

According to some embodiments the method comprises the steps of:
- setting the transverse dimension of said products;
- determining the distance between consecutive cradles on said chains based on said transverse dimension;
- connecting said cradles to said chains according to a pitch corresponding to said distance.

The distance, i.e. the pitch between adjacent cradles, is determined such that the space between consecutive cradles allows the products to be loaded on said cradles and unloaded therefrom, and that the number of cradles along said chains is maximized. The method can further include the step of increasing the distance between consecutive cradles with respect to the minimum distance which would allow loading and unloading the products, if required based on the weight of the products, i.e. to limit the overall load on the accumulator.

According to some embodiments, the method further includes the steps of sequentially loading products on said cradles connected to said chains according to said pitch; temporarily storing said products in said accumulator; unloading said products from said accumulator. Advantageously, the cradles are connected to the chains by means of a pivoting connection. Unloading of the products is advantageously performed by pivoting said cradles around the pivoting axis. The method can further include the steps of modifying the number of products loaded in said cradles by increasing or decreasing the lengths of two festoons formed by said chains, one festoon including cradles loaded with products and the other festoon including empty cradles.

BRIEF DESCRIPTION OF THE DRAWINGS

The invention shall be better understood by following the description and the accompanying drawing, which shows non-limiting practical embodiments of the invention. More in particular, in the drawing:

FIG. 3 shows a portion of an accumulator of FIG. 1;

FIG. 4 shows an enlargement of the detail IV of FIG. 3;

FIG. 5 is a side view to V-V of FIG. 3;

FIG. 6 shows an enlarged section according to VI-VI of FIG. 3;

FIG. 7 shows a view similar to that of FIG. 3 with a different arrangement of the accumulator;

FIG. 8 is a view according to VIII-VIII of FIG. 7;

FIG. 9 shows an enlargement of the detail IX of FIG. 7;

FIG. 10 is an enlargement section according to X-X of FIG. 9;

FIG. 13 shows an enlargement of the detail XIII of FIG. 12;

FIG. 14 is a section according to XIV-XIV of FIG. 13;

FIG. 15 is a side view according to XV-XV of FIG. 16 of a portion of an accumulator in a modified embodiment;

FIG. 16 is a section according to XVI-XVI of FIG. 15;

FIG. 17 shows a section similar to the section of FIG. 16 in a further modified embodiment; and FIG. 18 shows a section similar to the sections of FIGS. 16 and 17 in a further modified embodiment.

DETAILED DESCRIPTION OF EMBODIMENTS OF THE INVENTION

Figure 1:
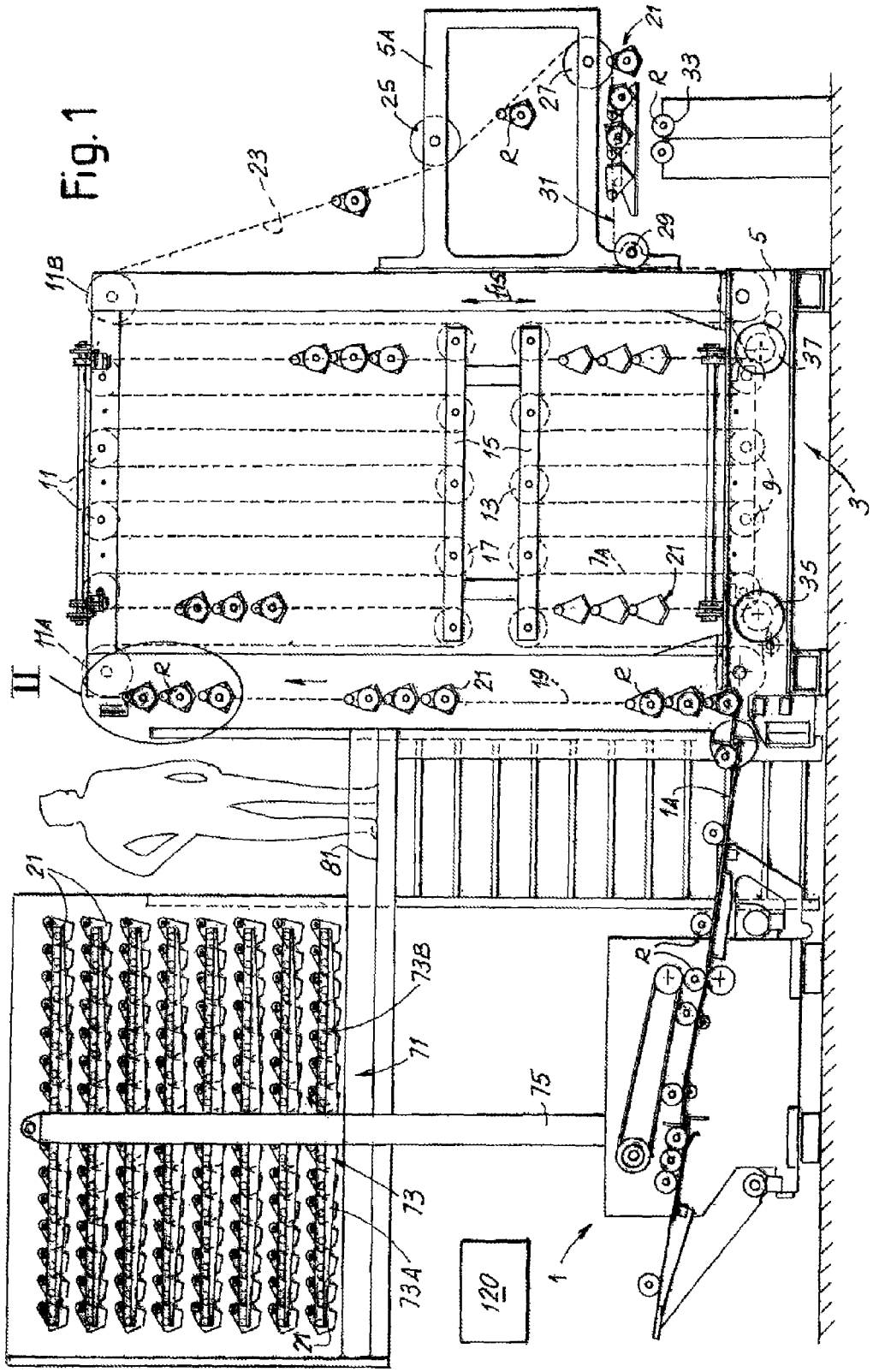
FIG. 1 is a side view of a portion of a production line for producing tissue paper rolls.

FIG. 1 shows a portion of a production line of rolls of web material, for instance tissue paper rolls, for producing articles such as toilet paper or kitchen towels.

More in particular FIG. 1 shows a gluer for gluing the final free end of rolls or logs of web material produced by a rewinding machine arranged upstream and not shown. The gluer can be designed in any known manner and it will not be described in detail.

The rolls unloaded from the gluer 1 are stored in an accumulator indicated as a whole with number 3.

The accumulator 3 comprises a structure 5 defining a path for at least one pair of chains 7A, 7B, only one of which is shown in FIG. 1, and both being visible in the side view of FIG. 5. The chains 7A, 7B extend on paths arranged on substantially parallel planes, the paths being substantially equal to one another and defined by a plurality of chain guide wheels. In the illustrated example the lying planes of the chains are substantially vertical.

In the illustrated embodiment two series of guide wheels with fixed axis, indicated respectively with 9 and 11, are fixed to the structure 3. A first series of guide wheels 13 with movable axis is provided on a movable support 15, on which also a second series of wheels 17 with movable axis is provided. This configuration is known per se. The lifting and lowering movement according to the double arrow f15 of the movable support 15 modifies the length of the chain branches defined between the wheels 9 and 13 and between the wheels 11 and 17 respectively, to modify the quantity of rolls or logs stored in the accumulator 3.

As can be appreciated from FIG. 1, therefore, the chains 7A, 7B form a first festoon defined by the movable wheels 17 and the fixed wheels 11 and a second festoon between the movable wheels 13 and the fixed wheels 9. In the embodiment shown, the first festoon is a full festoon, since logs are loaded in the cradles of said festoon. The second festoon is an empty festoon, since the cradles along said second festoon are empty.

The accumulator 3 has an inlet chain branch 19, provided with a lifting movement, from a lower end, where the cradles 21 fixed to the chains 7A, 7B receive the rolls R coming from the gluer 1, upwards, where a first pair of coaxial wheels 11A with fixed axis drive the chains downwards. The inlet branch forms a connection between the first festoon and the second festoon at the inlet side of the accumulator.

On the opposite side of the accumulator 2 an unloading or outlet branch 23 is defined. The unload branch connects the first festoon and the second festoon on the outlet side of the accumulator, that extends from a last pair 11B of coaxial wheels with fixed axis toward a pair of side wheels 25 carried by a projecting part 5A of the fixed structure toward a pair of outlet coaxial wheels 27. Between them and a pair of return wheels 29 a chain segment 31 extends, with substantially horizontal extension, along which the cradles 21 are made pivot to unload the rolls R into channels 33 for feeding a severing machine, not shown.

A motorization, comprising for instance an electric motor 35, moves the pairs of chains 7A, 7B forward with a continuous or intermittent movement along the two substantially equal, parallel, closed paths defined by the two chains, so that the cradles 21 pass in front of an exit slide 1A of the gluer to collect the rolls R fed by the gluer 1. A second motorization 37 moves the exit part of the chains 7A and 7B to unload the rolls on the channels 33 at the rate required by the severing machine. In a known manner the motorization 35 controls the movement of the chains so as to collect the rolls occupying, if possible, all the available cradles 21, making them move forward along the downward branch 19 with a continuous movement, if necessary at variable speed, or in a stepped manner. The motorization 37 vice versa controls the feed speed of the chains 7A, 7B along the downward branch 23 (with a continuous or intermitting motion) at a speed determined by the rate of feeding the rolls R to the downstream severing machine. As the production rate of the upstream rewinding machine is not necessarily equal to that of the downstream severing machine, the quantity of rolls stored in the accumulator 3 can vary over the time and, due to the effect of the above described configuration, the cradles 21 in the upward branch 19 of the chains 7A, 7B and along the branches extending between the wheels 11 and the wheels 17 will be full, and also the chains extending between the wheels 11B and the wheels 27 will be full, while the branches of the chains 7A, 7B between the wheels 29 and the wheels 13, 9 will have empty cradles.

Figure 2:
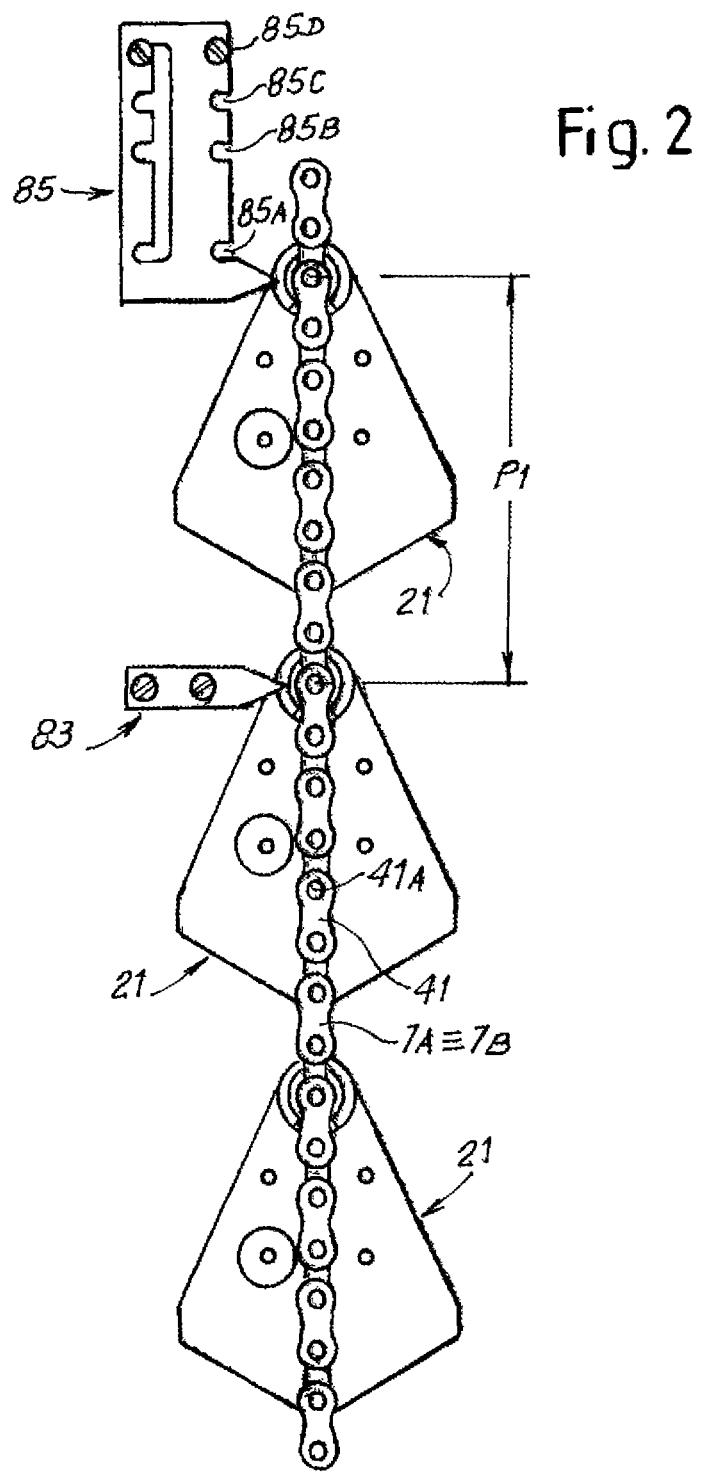
FIG. 2 is an enlargement of the detail indicated with II in FIG. 1.

FIG. 2 shows a side view of an enlargement of a portion of one of the two chains 7A, 7B. The two chains are substantially symmetrical and therefore only one of them will be described.

The chains 7A, 7B have a plurality of links 41 articulated to each other in correspondence of articulation pins 41A. The cradles 21 are connected to the pair of chains 7A, 7B according to a pitch step indicated with P1 in FIG. 2. In the illustrated configuration the pitch P1 between consecutive cradles 21 corresponds to eight chain pitches, wherein a chain pitch corresponds to a chain link. According to the invention, the chains 7A, 7B are designed so as to vary with high flexibility the pitch between consecutive cradles, i.e., the relative distance between consecutive cradles, to adapt the accumulator 3 to variable diameter dimensions of the rolls R. This feature will be better understood with reference to the subsequent FIGS. 3 to 10, wherein in FIGS. 3 to 6 a first arrangement of cradles 21 is shown, with a first pitch or reciprocal distance, and in FIGS. 7 to 10 a second arrangement is shown with the cradles connected to the chains according to a different pitch or reciprocal distance to receive rolls of smaller diameter.

In FIGS. 3 to 6 the cradles are connected to the chains 7A, 7B at such a reciprocal distance to receive rolls R with a diameter D2, for example 200 mm. The distance between the cradles 21 (see in particular FIG. 4) must be so as to allow easy loading of the rolls R and unloading thereof.

As it is shown in particular in the enlargement of FIG. 6, two subsequent cradles 21 are in this case connected to the chains 7A, 7B at a distance corresponding to twelve chain pitches, i.e. to twelve links. This distance is indicated as pitch P2 between consecutive cradles.

In the configuration of FIGS. 7 to 10, vice versa the pitch between the consecutive cradles 21 is indicated with P1 and is equal to eight chain pitches, i.e. to eight chain links. In this case the diameter of the rolls is indicated with D1 and is smaller than the diameter D2 of the rolls illustrated in FIG. 4.

Thanks to the smaller diameter D1 of the rolls R, in FIG. 7 the cradles 21 can be positioned at a smaller reciprocal distance (P1) than the reciprocal distance (P2) of the cradles in the arrangement of FIGS. 3 to 6.

FIGS. 6 and 10 show in detail also a possible embodiment of the reciprocal constraining members for constraining the cradles 21 to the chains 7A, 7B. In this embodiment each articulation pin 51 between consecutive links 52 of each chain 7A, 7B extends toward the opposite chain, i.e. the two chains 7A, 7B have respective articulation pins of the links 52 directed toward the inside of the pair of chains, i.e. toward the cradles 21 connected to the chains.

Advantageously, in this embodiment each pin 51 has a head 53 and each cradle 21 has side arms 21B, each of which is provided with a seat 21A for engaging a respective pin 51. Each cradle is therefore connected to the two parallel chains 7A, 7B by inserting two respective pins 51 in the opposite seats 21A of the arms 21B. In this way each cradle 21 is articulated around an oscillation axis A-A to the two chains 7A, 7B. The oscillation axis A-A corresponds to the articulation axis of two consecutive links 52 in correspondence of the pin 51 inserted in the respective seat 21A of the cradle.

Advantageously, also a stop can be provided preventing the cradles from being accidentally released from the pins 51. In the illustrated example, the stop associated with each seat 21A is constituted by a resilient member and is indicated as a whole with number 55. In this embodiment the stop 55 has a stem 57 inserted in a through hole 59 obtained on the arm 21B of the cradle, the axis B-B of the through hole 59 being substantially parallel to the articulation axis A-A of the cradle 21 to the chains 7A, 7B.

The stem 57 is resiliently stressed by a spring 61 housed inside the hole 59 and held between a projection 57A of the stem 57 and a projection 59A of the hole 59. The stem 57 projects with an end 57B thereof toward the seat 31A and with a head 57C at the opposite side, i.e. toward the inside of the cradle 21. The head 57C constitutes a maneuvering member, through which a mechanical device (described below) or an operator can exert a traction causing the compression of the spring 61 and therefore the retraction of the stem 57 inside the hole 59 thus releasing the cradle from the pin 51.

Since, as illustrated in FIGS. 3 to 10, each of the two chains 7A, 7B has a plurality of projecting pins 51 equal to the number of links and therefore to the number of articulations between subsequent links, it is possible to connect a variable number of cradles 21 at a variable pitch to the two chains 7A, 7B, so that the overall number of cradles and the distance between them is always optimized based upon the diameter D1, D2 of the rolls R stored in the accumulator 3.

To define the pitches at which the cradles 21 can be arranged obtaining a uniform arrangement according to the number of links of the chains 7A, 7B, it is possible to operate as follows. Firstly, a plurality of pitches that one wants to obtain through adequate arrangement of the cradles 21 along the chains 7A, 7B, must be defined. These pitches are defined according to the diameters of the rolls and are selected so that between a cradle and the subsequent cradle there is sufficient space to load and unload the roll of a given diameter, the space however being at the same time limited to exploit the chain length in an optimal manner.

By expressing the pitches or reciprocal distances between subsequent cradles as number of links between subsequent cradles, the number of links of each pitch of reciprocal distance between cradles is divided so as to define the lowest common multiple between the reciprocal distances of the cradles. This lowest common multiple will be defined as "chain module". The total number of chain links, i.e. of chain pitches, will be obtained by multiplying the length, expressed as number of links, of a chain module and a number of total modules.

For instance, realizing chains with an overall number of pitches, i.e. of links, equal to 2880 and selecting a chain module equal to 360 links, i.e. 360 pitches, it is possible to arrange the cradles 21 according to pitches of 8, 9, 10, and 12 links respectively. More in particular, the following configurations will be possible:

for a reciprocal distance or pitch between cradles equal to 8 chain pitches (8 chain links), there will be overall 360 cradles, i.e. 2880:8=360;

for a reciprocal distance or pitch between cradles equal to 9 chain pitches (9 chain links), there will be overall 320 cradles, i.e. 2880:9=320;

for a reciprocal distance or pitch between cradles equal to 10 chain pitches (10 chain links), there will be overall 288 cradles, i.e. 2880:10=288;

for a reciprocal distance or pitch between cradles equal to 12 chain pitches (12 chain links), there will be overall 240 cradles, i.e. 2880:12=240.

If a more capacious accumulator must be provided, a different number of overall links can be adopted. For instance, ten modules of 360 links can be provided, and therefore chains long 10×360=3600 links. In general, the overall length (L) of the chains expressed in number of links will be obtained as follows:

$$L = N \times M$$

where N is a natural number and M is the number of links per module, i.e. 360 in the example above.

In this way it is possible to configure the accumulator with a number of equidistant cradles, i.e. spaced by a constant pitch, whose number is optimized according to the diameter dimension of the rolls. The operator can choose one or the other of the various link pitches (8, 9, 10 and 12 links in the illustrated example) giving a uniform, i.e. equidistant, distribution of the cradles.

It should be however understood that the equidistance between cradles connected to the chains does not require to be maintained strictly. In fact, the constant pitch between the cradles has a series of advantages, firstly as regards the simple control of the accumulator for roll loading and unloading. However, substantial advantages over the traditional accumulators can be anyway obtained even if some pitches between the cradles are different than the others. In particular, it is possible to provide for instance that there is only a pair of consecutive cradles spaced from each other by an anomalous pitch, i.e. a pitch different than for the other pairs of cradles. This anomalous pitch can be managed in a relatively simple manner by a programmable central control unit of the accumulator.

In the above illustrated example, the chain made of 2880 links can receive cradles arranged at a constant pitch equal to 8, 9, 10 or 12 links. It is however possible to arrange the cradles at a reciprocal distance of 11 links. In this case a total of 260 cradles can be applied, spaced from each other by 11 links, leaving a pair of cradles spaced by an anomalous pitch equal to 20 links. Therefore, along the entire extension of the chain all the cradles can be filled with rolls, except the cradle corresponding to the anomalous pitch. The programmable control unit knows the position of this anomalous pitch along the chain extension of the accumulator and it can therefore store the fact that that position cannot receive more rolls.

Even if it is possible to provide more than one anomalous pitch if this type, it is better to concentrate in a single point (between a pair of consecutive cradles) the excess chain links in the case of a subdivision of the chain into pitches containing a number of links not constituting a submultiple of the overall number of links of the chain, as it allows a simpler management of the accumulator. However it is theoretically possible, for instance in the above mentioned case of a pitch of 11 links, to distribute the exceeding links between two pairs of cradles, for instance 5 links between a first pair and 4 links between a second pair of cradles. In this case, two cradles must remain empty.

In view of the above description it should be understood that in general, according to the chosen configuration, i.e. the pitch according to which the cradles 21 are arranged, depending upon the diameters of the rolls R to be processed, there will be a single situation (pitch or reciprocal distance between cradles equal to 8 chain pitches or chain links) wherein all the available cradles will be mounted on the accumulator 3. In the remaining cases a certain number of cradles must be removed from the accumulator 3 and stored in a storing device. The greatest numbers of unused cradles will be present when the cradles are fixed to the chains 7A, 7B spaced by 12 chain pitches, i.e. twelve chain links. In this case, in the above illustrated example, 240 cradles will be mounted on the accumulator 3, whilst 120 cradles will be arranged in a storing device.

In FIG. 1, number 71 indicates as a whole the storing device for the unused cradles 21. In this embodiment the storing device 71 comprises a plurality of planes 73, each of which can be actually defined by two pairs of opposite parallel shelves 73A, 73B. The distance between shelves of each pair is such as to allow resting the cradles. The planes 73 can be advantageously oscillating around respective axes of oscillation in correspondence of which the planes 73 are articulated to an upright 75. In this way it is possible to move the cradles from an end to the opposite end of the planes 73 when the cradles 21 must be taken from the storing device to be mounted on the chains 7A, 7B. To this end the arms 21B of the cradles can be provided with wheels, to facilitate the movement along the shelves defining the planes 73.

In the example illustrated in FIG. 1 mounting and demounting of the cradles occurs manually by mean of two operators who, to this end, can be on a platform 81 arranged at an adequate height between the accumulator 3 and the storing device 71. Two operators are at the two ends or flanks of the accumulator 3 and, working in a synchronous manner, can demount and mount the cradles by engaging them at the respective ends, in correspondence of the arms 21B. The use of two operators is necessary due to the high length of the cradles 21 that can have a length of even 5 meters. If the products to be stored on the accumulator 3, and therefore the respective cradles 21, are of substantially smaller longitudinal dimensions, only one operator could be sufficient.

To facilitate mounting and demounting of the cradles 21 by observing the pitch required for each specific configuration of the accumulator 1, in an advantageous embodiment of the invention a device is provided, illustrated in particular in FIG. 2 and described below. The device in question comprises two indexes 83 and 85, carried for instance by the fixed structure 5 of the accumulator 3. In the illustrated embodiment the index 83 is in a fixed position, while the index 85 can take a distance adjustable according to the index 83. In the illustrated example, by assuming to arrange the cradles 21 according to four possible distances of 8, 9, 10, and 12 chain pitches respectively, the reciprocal distance between the indexes 83 and 85 can be adjusted in four distinct positions, each of which is characterized by a distance between the tips of the indexes corresponding to the distance at which the cradles must be arranged along the chains. The device can be single and arranged adjacent to one of the chains 7A, 7B. In other embodiments, two devices 83, 85 can be provided, symmetrical or equal to each other, associated to one and the other of the two chains 7A, 7B respectively.

To adjust and reciprocally to fix at the desired distance the two indexes 83, 85, according to some embodiments the adjustable index 85 has four pairs of slots 85A, 85B, 85C, 85D. The adjustable index 85 is made to slide parallel to the branch 19 of the chain 7A or 7B and is fixed for instance through a pair of screws in correspondence of one or the other of the four pairs of slots 85A, 85B, 85C, and 85D. In the example illustrated in FIG. 2, as the desired distance P1 between the cradles 21 is equal to eight chain links, the two indexes 85, 83 are at the minimum distance and the screw blocking means are engaged in the slots 85D. Once the indexes 83, 85 have been adjusted in this reciprocal position, the operators must only demount the cradles 21 previously mounted on the chains 7A, 7B and mount them again one after the other positioning in sequence the pins of one of the chains 7A, 7B in correspondence of the indexes 83, 85.

For instance, with reference to FIG. 2, suppose that the cradles 21 are mounted by moving the pair of chains 7A, 7B downwards. In this case the first two lower cradles 21 have been mounted in a previous working step. The fixed index 83 is in correspondence of the articulation pin of the second cradle 21 from the bottom, the third cradle 21 will be therefore fixed in correspondence of the link pin that is at the height of the index 85. Once this third cradle has been fixed, the pair of chains 7A, 7B slides downwards until the axis of the third cradle is in correspondence of the fixed index 83 and the fourth cradle will be therefore fixed in correspondence of the adjustable index 85. In this way it is not necessary that the operators count the chain links between one cradle and the other, but they can use the indexes 83, 95 to locate immediately and correctly the pins of the chains 7A, 7B in correspondence of which the cradles 21 must be fixed sequentially applied to the pair of chains.

The process described above can be performed also with a reverse movement of the chains, i.e. from the bottom upwards.

In other embodiments demounting and mounting the cradles can occur in a mechanized or automated manner. To this end a device can be used, described below with reference to FIGS. 11 to 14.

Figure 11:
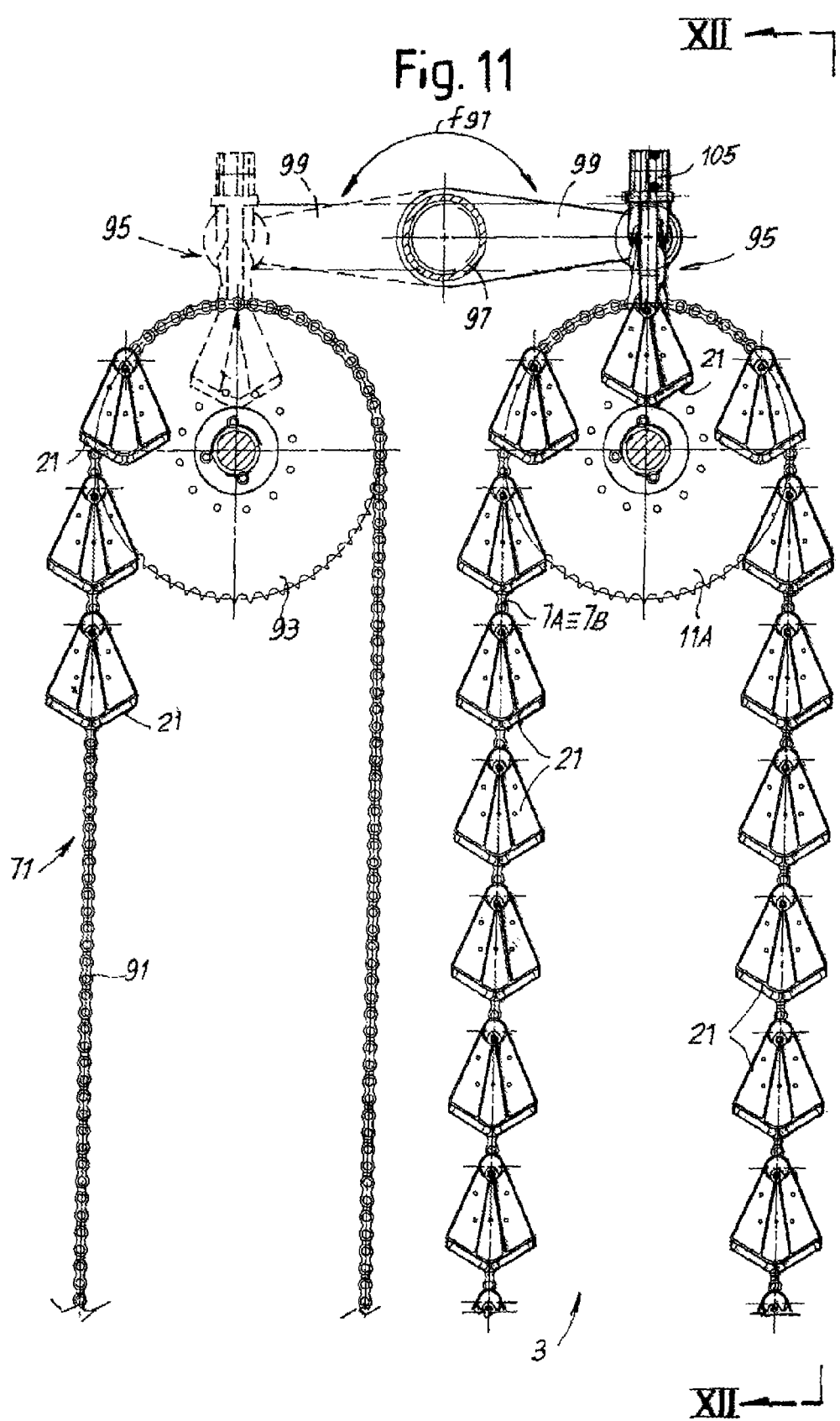
FIG. 11 is a portion of an accumulator with a storing device for unused cradles and a transferring system for transferring the cradles from the accumulator to the storing device and vice versa.

FIG. 11 shows a portion of the accumulator 3, with a portion of chains 7A, 7B driven around a pair of upper wheels 11A with fixed axis. In this case, adjacent to the accumulator 3 a storing device is arranged, indicated as a whole with number 71 again, having a different structure than that illustrated with reference to FIG. 1. In fact, in this embodiment, the storage device 71 comprises a pair of chains 91 parallel to each other and driven around wheels 93 to form a sort of coil; FIG. 11 only shows the portion of this coil adjacent to the portion of accumulator 3 illustrated in this figure. Advantageously, the pair of coaxial guide wheels 93 with fixed axis are at the same height as the coaxial guide wheels 11A of the chains 7A, 7B. Above the wheels 11A, 93 a positioning system is arranged, indicated as a whole with number 95, comprising transferring members for transferring the cradles from the accumulator 3 to the storing device 71 and vice versa.

Figure 12:
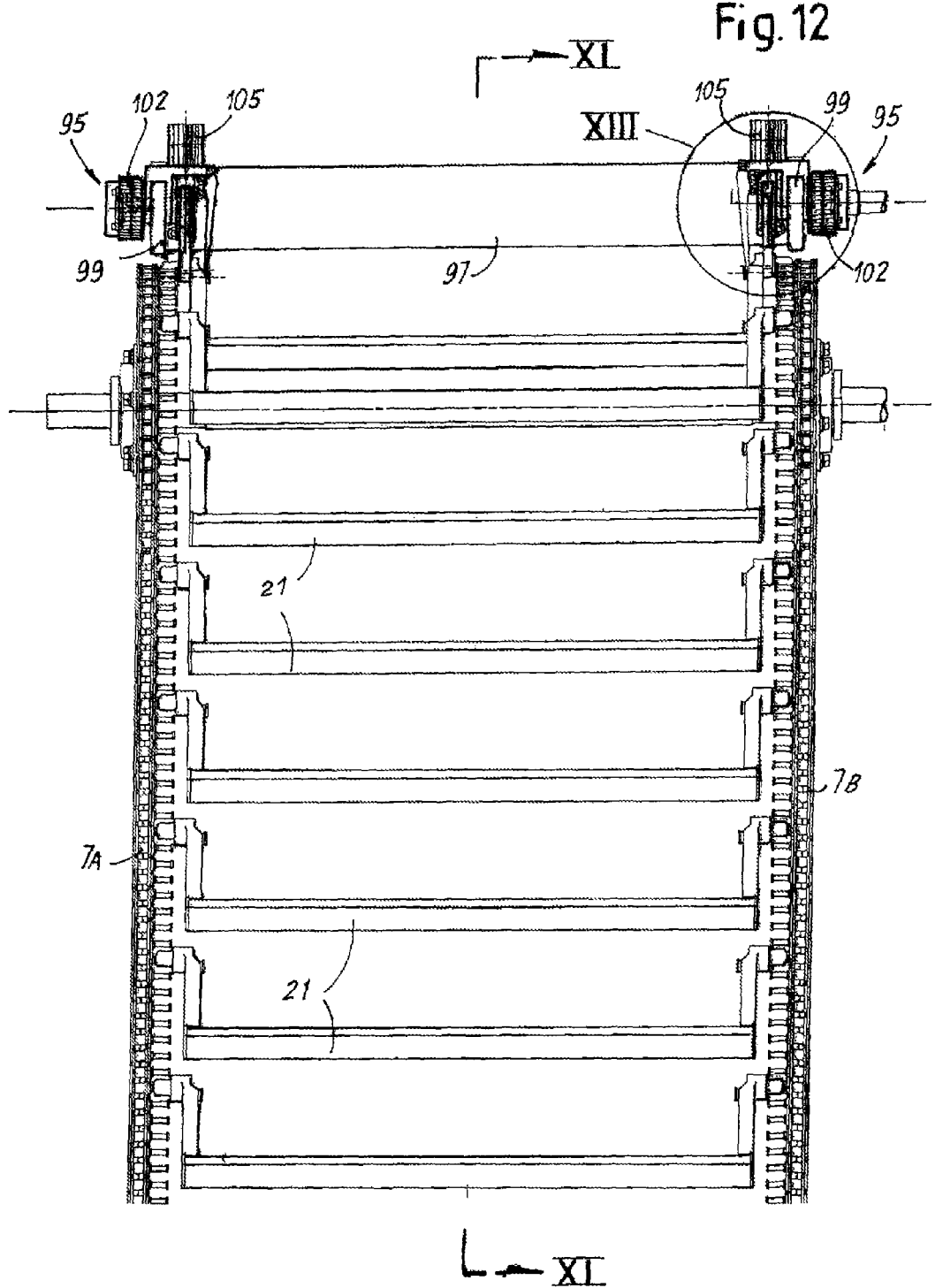
FIG. 12 is a view according to XII-XII of FIG. 11.

The structure of a possible embodiment of the positioning system and of the related transferring member will be described below with reference to FIGS. 12, 13, and 14.

In this embodiment the positioning system 95 comprises a beam or shaft 97, whose axis is substantially parallel to the axes of the guide wheels of the chains 7A, 7B of the accumulator 3 and of the wheels 91 of the store unit 71. The beam or shaft 97 rotates around its own axis and can perform for example a 180° rotation according to the double arrow f97 (FIGS. 11 and 14) by means of an adequate control member, not shown.

Arms 99 are fixed to the beam or shaft 97, that carry at the opposite end respective devices 101 for coupling and releasing the cradles 21, having the function of engaging the cradles and releasing them from, and, reversely, connecting them to, the chains 7A, 7B, 91.

In some embodiments each device 101 has a pair of jaws 103 controlled by an actuator, for instance a cylinder-piston actuator 105 controlling the opening and closing movement thereof. The jaws 103 are designed to engage the appendixes, indicated with 21BX, of each arm 21B of the cradles 21. In these appendices the seats 21A are obtained for the pins 51 of the chains 7A, 7B, as well as the hole 59 of the blocking stem 57. In addition to the jaws 103, each device 101 has a mechanical finger 105 articulated to a bracket 109 and carried by the respective arm 99 of the corresponding device 101. The mechanical finger 105 has a cam profile 105A cooperating with a tappet 11 provided on a cursor 113 carrying the jaws 103 and movable according to the double arrow f113 under the control of the actuator 105.

As it can be understood for instance from FIG. 13, when the cursor 113 is moved upwards the jaws 103 close and the mechanical finger 101 rotates around the articulation 107 according to the arrow f105. The end of the mechanical finger 105 (opposite to the axis 107 of articulation of said finger to the bracket 109) is shaped so as to engage the head 57C of the stem 57. In this way, see FIG. 13 again, when the device 101 is brought in correspondence of a cradle that is above the rotation axis of the pair of wheels 11A or of the pair of wheels 93, the upward movement of the cursor 113 controlled by the actuator 105 causes the engagement of the appendix 21BX of the corresponding arm 21B of the cradle 21 and the extraction of the stem 57, overcoming the compression force of the spring 61. In this way, by acting simultaneously with the two opposite devices 101, the cradle engaged by the devices 101 is disengaged from the pins of the chains to which it was engaged, and it can be transferred, through a 180° rotation movement of the arms 99 connected to the shaft or beam 97. From the position illustrated in FIG. 11 it is therefore possible to transfer the cradle 21 to the storage device 71. The reverse operation allows transferring a cradle from the storing device 71 to the accumulator 3.

To the 180° rotation according to the double arrow f97 of the arms 99 carrying the devices 101 corresponds a rotation of the devices 101 around a respective horizontal axis parallel to the axis of the shaft or beam 97. This rotation of the devices 101 is obtained by means of a toothed belt 100 driven around a toothed pulley 102 (FIG. 12) coaxial to the shaft or beam 97 and around a corresponding toothed pulley 104 of equal diameter carried at the end of the respective arm 99.

Through an adequate control unit, schematically indicated with 120 in FIG. 1, with which the various motorizations and the actuators and the position encoders, if any, of the store unit 71 and of the accumulator 3 are interfaced, it is so possible to position the cradles automatically.

In the previously described figure a possible way is described for producing the constraining members for constraining the cradles 21 to the chains 7A, 7B of the accumulator 3 and, if necessary, to the chains 91 of the store unit 71. These constraining members can be however produced in a different manner than what described above. The shape of these constraining members is complementary to the shape of the pins of the chains 7A, 7B and 91, if necessary, that in turn can be different than what illustrated above.

FIGS. 15 and 16 show an alternative embodiment of the constraining members for constraining the cradles 21 to the chains 7A, 7B. Equal numbers indicate equal or corresponding parts to those described with reference to the previous figures.

In this embodiment, to each arm 21B of the cradles 21 a stem is associated, indicated again with 57, that can slide in a seat constituted by a through hole 59 obtained in a respective appendix 21BX of the corresponding arm 21. The stem 57 has a head 57C facing the opposite arm 21B of the cradle 21 and an end 57B facing the outside, i.e. the chain to which the cradle 21 must be connected. The end 57B has in this case a blind hole 57BX coaxial to the stem 57. The hole 57BX forms a coupling seat for the corresponding pin 51 of the chain 7A, 7B to which the cradle 21 must be connected.

In this embodiment the chains are therefore provided again with articulation pins between subsequent links 52 projecting inwards, i.e. toward the opposite chain, and form the complementary element to the constraining members carried by the cradles 21.

Releasing of the cradles occurs through traction of the stem 57 engaged in correspondence of the head 57C with consequent compression of the spring 61 surrounding the stem 57 and housed in the hole 59.

FIG. 17 shows, in a section similar to that of FIGS. 10 and 16, a further embodiment of the constraining members of the cradles 21 to the chains 7A, 7B and, if necessary, to the chains 91 of the storage device 71 when it is designed as illustrated in FIG. 11.

In this embodiment, the chains 7A, 7B have articulation pins 51 between consecutive links 52 that are hollow, i.e. provided with a through hole 51A. The stems 57 of the cradles 21 are housed again in through seats formed by the holes 59 provided in the appendices 21BX of the respective arms 21B. Each stem 57 has a head 57C projecting towards the inside, i.e. toward the opposite arm, and is stressed by a compression spring 61 housed in the hole 59, pushing the pin 57 toward the outside reacting against an annular projection 57A. In addition to the annular projection 57A, the pin 57 has an end 57B, whose length is sufficient to insert in one of the holes 51A of the pins 51 of the chains 7A, 7B and, if necessary, 91.

Coupling and releasing of the cradles occurs, as in the other embodiments, by pushing the stem 57 against the force of the compression spring 61 and engaging it in correspondence of the head 57C.

FIG. 18 shows, in a section similar to that of FIGS. 10, 16, and 17, a further embodiment of the constraining members. In this case the links 52 of the chains 7A, 7B and, if necessary, 91, are connected in correspondence of the respective articulations through pins 51 presenting coaxial holes 51A. The ends 57B of the stems 57, which are shaped as described with reference to FIG. 17, are inserted in these holes.

It is understood that the drawing only shows an example provided by way of a practical arrangement of the invention, which can vary in forms and arrangements without however departing from the scope of the concept underlying the invention. Any reference numbers in the appended claims are provided for the sole purpose of facilitating reading of the claims in the light of the description and the drawing, and do not in any manner limit the scope of protection represented by the claims.

The invention claimed is:

1. An accumulator for elongated products, comprising:
   at least one pair of chains substantially parallel to each other, to which cradles are pivotally connected for receiving products to be stored, the cradles being mutually spaced along said pair of chains, wherein each cradle is connected to said pair of chains by constraining members;
   a product inlet;
   a product outlet;
   a positioning system for positioning the cradles along said chains;
   wherein said chains are driven around wheels with movable axes supported by a movable support and wheels with fixed axes, said wheels subdividing the two chains into storing branches in which the products are stored and empty branches, a lifting and lowering movement of said movable support modifying length of the storing branches and the empty branches to modify quantity of products storable in the accumulator; and wherein on each chain is arranged at least one constraining member intermediate between two consecutive cradles connected to said chains.

2. The accumulator according to claim 1, wherein said chains form a loading branch, along which products are loaded on said cradles, and an unloading branch, along which products are unloaded from said cradles.

3. The accumulator as claimed in claim 1, wherein reciprocal distance between adjacent cradles connected to said chains is adjustable according to a dimension of said products.

4. The accumulator as claimed in claim 1, wherein each of said chains comprises a plurality of groups of chain links, each group of chain links comprising at least one constraining member.

5. The accumulator as claimed in claim 4, wherein each group of chain links comprises a same number of chain links.

6. The accumulator as claimed in claim 4, wherein each chain link comprises a respective constraining member.

7. The accumulator as claimed in claim 1, wherein said constraining members are arranged in correspondence of respective axes of reciprocal articulation of chain links.

8. The accumulator as claimed in claim 1, wherein each of said chains is subdivided into chain modules, each of which comprises a number of chain links corresponding to a lowest common multiple of a plurality of pitches at which said cradles can be arranged along said chains, each pitch being expressed as chain links interposed between one cradle and a subsequent cradle.

9. The accumulator as claimed in claim 1, wherein each cradle is provided with devices for reversible coupling to the chains.

10. The accumulator as claimed in claim 1, wherein each cradle is provided with devices for coupling to said chains.

11. The accumulator as claimed in claim 9, wherein said devices for reversible coupling comprise resilient fastening elements for fastening to pins fixed to said chains.

12. The accumulator as claimed claim 1, further comprising a storage device for storing cradles that are not constrained to said chains.

13. The accumulator as claimed in claim 1, wherein said positioning system is automatically controlled by an electronic control unit.

14. The accumulator as claimed in claim 1, further comprising a storage device for storing cradles that are not constrained to said chains and wherein said positioning system comprises members for transferring the cradles from the chains to the storage device and vice versa.

15. The accumulator as claimed in claim 14, wherein said positioning system comprises releasing and coupling devices for releasing the cradles from, and coupling them to, the chains.

16. The accumulator as claimed in claim 1, further comprising at least one motorization to move said chains forward and a control unit for controlling said motorization, that can be programmed so as to move said chains forward in a stepped manner, the forward pitch being selectable by a user among at least two different forward pitches.

17. An accumulator for elongated products, comprising:
   at least one pair of chains substantially parallel to each other, to which cradles are pivotally connected for receiving products to be stored, the cradles being mutually spaced along said pair of chains, wherein each cradle is connected to said pair of chains by constraining members;
   a product inlet;

a product outlet;

wherein said chains are driven around wheels with movable axes supported by a movable support and wheels with fixed axes, said wheels subdividing the two chains into storing branches in which the products are stored and empty branches, a lifting and lowering movement of said movable support modifying length of the storing branches and the empty branches to modify quantity of products storable in the accumulator; wherein on each chain is arranged at least one constraining member intermediate between two consecutive cradles connected to said chains; wherein said accumulator further includes, for at least one of said chains, a pair of indexes connected to a support structure to which guide wheels of said chains are associated, and wherein said indexes are spaced from each other along a path of said at least one chain; and wherein reciprocal distance of said indexes is adjustable.

18. The accumulator as claimed in claim 17, wherein one of said indexes is fixed and one of said indexes is movable to adjust the reciprocal distance of said two indexes.

19. A method for configuring an accumulator for elongated products, comprising at least one pair of chains substantially parallel to each other, to which cradles are connected for receiving products to be stored along a loading branch of said pair of chains and unloading said products along an unloading branch of said pair of chains, the cradles being mutually spaced along said pair of chains, each cradle being suspended to said pair of chains through constraining members; said method comprising:

determining reciprocal distance at which consecutive cradles must be arranged according to a dimension of said elongated products;

connecting said cradles to said chains at said reciprocal distance; and further comprising:

storing unused cradles in a storage device, when the number of total cradles exceeds a number of cradles connected to said chains; or removing cradles from a storage device when the number of cradles to be connected to said chains exceeds a number of cradles already connected to said chains.

20. The method according to claim 19, further comprising providing a positioning system having transferring members for transferring the cradles from the accumulator to the storage device and vice-versa.

21. A method for configuring an accumulator for elongated products, comprising at least one pair of chains substantially parallel to each other, to which cradles are connected for receiving products to be stored along a loading branch of said pair of chains and unloading said products along an unloading branch of said pair of chains, the cradles being mutually spaced along said pair of chains, each cradle being suspended to said pair of chains through constraining members; said method comprising:

determining reciprocal distance at which consecutive cradles must be arranged according to a dimension of said elongated products;

connecting said cradles to said chains at said reciprocal distance; and further comprising: a positioning system for positioning the cradles along said chains.

* * * * *

UNITED STATES PATENT AND TRADEMARK OFFICE
CERTIFICATE OF CORRECTION

| | | |
|---|---|---|
| PATENT NO. | : 9,132,962 B2 | Page 1 of 1 |
| APPLICATION NO. | : 13/983471 | |
| DATED | : September 15, 2015 | |
| INVENTOR(S) | : Giancarlo Cicalini and Romano Maddaleni | |

It is certified that error appears in the above-identified patent and that said Letters Patent is hereby corrected as shown below:

ON THE TITLE PAGE:

(30) Foreign Application Priority Data, "Feb. 3, 2011 (IT) ................ FI2011A00203" should read
-- Feb. 3, 2011 (IT) ................ FI2011A000020 --.

Signed and Sealed this
Nineteenth Day of April, 2016

Michelle K. Lee
*Director of the United States Patent and Trademark Office*